United States Patent [19]

Eddy, Jr.

[11] 4,141,430
[45] Feb. 27, 1979

[54] SPEED-RESPONSIVE TAG AXLE CONTROL SYSTEM

[75] Inventor: William C. Eddy, Jr., Birmingham, Mich.

[73] Assignee: Aspro, Inc., Westport, Conn.

[21] Appl. No.: 848,599

[22] Filed: Nov. 4, 1977

Related U.S. Application Data

[63] Continuation-in-part of Ser. No. 704,128, Jul. 15, 1976, abandoned.

[51] Int. Cl.$^2$ .................. B60K 41/20; B62D 61/12
[52] U.S. Cl. ..................... 180/105 E; 180/24.02; 280/704; 303/96
[58] Field of Search ............ 180/24.02, 105 R, 105 A, 180/82 D, 105 E; 303/96, 109; 280/702, 704

[56] References Cited

U.S. PATENT DOCUMENTS

| 3,288,232 | 11/1966 | Shepherd ..................... 180/21 X |
| 3,390,895 | 7/1968 | Verdi ........................... 180/24.02 X |
| 3,499,663 | 3/1970 | Hedlund et al. ............. 180/24.02 X |
| 3,617,099 | 11/1971 | Sugiyama ..................... 303/96 |
| 3,706,351 | 1/1971 | Neisch ......................... 180/105 E X |
| 3,740,071 | 6/1973 | Bilas ............................ 180/24.02 X |
| 3,802,529 | 4/1974 | Burckhardt et al. ......... 303/96 X |
| 3,834,481 | 9/1974 | Carlson ........................ 303/96 X |
| 3,870,336 | 3/1975 | Bilas ............................ 280/704 |
| 3,995,883 | 12/1976 | Glaze ........................... 180/105 E X |

FOREIGN PATENT DOCUMENTS

| 1174179 | 7/1964 | Fed. Rep. of Germany ............ 303/96 |
| 2026547 | 12/1971 | Fed. Rep. of Germany ............ 303/96 |
| 2056636 | 5/1972 | Fed. Rep. of Germany ............ 303/96 |
| 2435099 | 2/1975 | Fed. Rep. of Germany ............ 303/96 |
| 2436058 | 2/1976 | Fed. Rep. of Germany ............ 303/96 |

OTHER PUBLICATIONS

ATZ, Automobiltechnische Zeitchrift; 70 Jahrgang, 1968 Nr. 7.

Primary Examiner—Joseph F. Peters, Jr.
Assistant Examiner—Michael Mar
Attorney, Agent, or Firm—Lawrence E. Laubscher

[57] ABSTRACT

A speed-responsive tag axle control system is disclosed including a comparison circuit which is operable when the rotational velocity of one driven wheel of a motor vehicle overruns the opposite driven wheel by a predetermined amount to simultaneously brake the faster driven wheel and shift the vehicle load from the tag axle wheels to the driven wheels. In one embodiment, a pressure fluid motor is connected between the tag axle and the vehicle chassis for normally transferring load from the driven wheels to the non-driven tag axle wheels, said motor being vented by said comparison circuit means to transfer the load back to the driven wheels upon the occurrence of a driven wheel overspin condition. In a second embodiment, the pressure fluid motor is connected between the driven wheels and the vehicle chassis, said pressure fluid motor normally being in the vented condition to cause load to be shared by the non-driven wheels, said motor being operable to the pressurized condition by the comparison circuit to effect transfer of load from the non-driven wheels to the driven wheels.

15 Claims, 7 Drawing Figures

SPEED-RESPONSIVE TAG AXLE CONTROL SYSTEM

REFERENCE TO RELATED APPLICATION

This application is a continuation-in-part application based on the prior U.S. application Ser. No. 704,128 filed July 15, 1976 entitled "Speed-Responsive Tag Axle Control System", now abandoned.

BRIEF DESCRIPTION OF THE PRIOR ART

It is well known in the prior art to provide vehicle braking systems for automatically braking one driven wheel when it overruns by a predetermined amount the opposite driven wheel which is connected thereto by a differential mechanism, as disclosed in the prior patents to Eger et al U.S. Pat. No. 3,025,722, Mikina U.S. Pat. No. 3,253,672, and Shepherd U.S. Pat. Nos. 3,169,595 and 3,238,232, and the Eddy application Ser. No. 600,505 filed July 30, 1975.

It is further known in the patented prior art to provide motor vehicles with non-driven tag axle systems for transferring vehicle load to and from the driven wheels, as evidenced by the patents to Bostrom U.S. Pat. No. 3,494,632, Hedlund et al U.S. Pat. No. 3,499,663, Granning U.S. Pat. No. 3,713,663, Pierce et al U.S. Pat. No. 3,771,812, and Mayer et al U.S. Pat. No. 3,877,715. It is further known to provide means for shifting vehicle load between tandem driven axles, as disclosed in the patents to Page U.S. Pat. No. 2,952,326, Hunzer U.S. Pat. No. 3,366,399 and Strader U.S. Pat. No. 3,920,283. In the Strader patent, sensor means are provided for sensing the deceleration rate of the vehicle to operate anti-wheel locking means and also to effect inflation of air spring means to transfer vehicle load to the rearward pair of driven wheels of the tandem arrangement, whereby the downward force exerted on the rear wheels counteracts the upward force on the rear axle resulting from the torque exerted by the brakes, thereby eliminating wheel hopping and improving braking efficiency.

SUMMARY OF THE INVENTION

The present invention was developed to provide an improved vehicle traction control system which is operable during acceleration when one driven wheel tends to overrun the opposite driven wheel connected thereto through the differential mechanism — such as might occur when one wheel is in a spinning condition on an icy surface, for example — to brake the faster running wheel and to automatically operate tag axle means to transfer weight toward the driven wheels.

Accordingly, a primary object of the present invention is to provide a vehicle traction control system including at least one pair of driven wheels arranged on opposite sides of the vehicle chassis and connected by a differential mechanism, a pair of non-driven wheels connected with the chassis frame adjacent the driven wheels, pressure motor means for vertically displacing one of said pairs of wheels relative to the chassis frame to transfer load to and from said driven wheels, respectively, a plurality of brake means associated with said driven wheels, respectively, a plurality of speed sensing means associated with said driven wheels, respectively, and comparison circuit means operable when one driven wheel overruns the other by a predetermined amount for automatically braking the faster driven wheel and for simultaneously operating the pressure motor means to transfer the vehicle weight to the driven wheels. In one embodiment, the pair of non-driven wheels are tag axle wheels the axle of which is pivotally connected with the frame for pivotal movement about a horizontal pivot axis, the pressure motor means being connected between the tax axle wheels and the chassis frame. The pressure motor means are normally in a pressurized condition and are operable to a vented condition by the comparison circuit means to shift load to the driven wheels during anti-spin operation. In a modification of this embodiment, two pairs of driven wheels may be provided that are driven in tandem through a differential. In a second embodiment of the invention, the pressure motor means are connected between the driven wheels and the chassis frame. In this embodiment, the pressure motor means is normally in the vented condition and is operable to the pressurized condition by the comparison circuit means during anti-spin operation. The axles of the driven and non-driven wheels may be connected to the chassis frame by equilizer means or by separate suspension spring means.

According to a more specific object of the invention, in the first embodiment the pressure motor means is normally pressurized to lower the tag axle wheels relative to the chassis frame, thereby to transfer load from the driven wheels. The comparison circuit means operates a two-position solenoid valve to interrupt the supply of pressure fluid to the pressure motor and to dump the fluid from the motor means, thereby to transfer load back to the driven wheels. Simultaneously, the brake means associated with the faster driven wheel is actuated, whereby owing to the automatic loading of the driven wheels and the braking of the faster wheel, the vehicle has sufficient traction to propel itself from the condition causing overruning of the driven wheel. In the second embodiment, the pressure motor means is connected between the pair of driven wheels and the vehicle chassis, said comparison circuit means operating a two-position solenoid valve from a normal venting condition to a pressurizing condition, thereby to pressurize the pressure motor upon the occurrence of an anti-spin condition to effect transfer of vehicle load to the pair of driven wheels.

A more specific object of the invention is to provide a traction control system of the type described above, wherein the pressure motor means is of the bellows type and the pressure fluid is a gaseous fluid such as air. In the first embodiment, the solenoid is operable by the comparison circuit means to vent the bellows means to atmosphere simultaneously with the operation of the brake means associated with the faster driven wheel. Preferably the conduit means for supplying pressure fluid to the motor means are designed to give a quick-dump slow-fill characteristic to the bellows means, In this regard, the bellows means preferably includes a pair of bellows for raising and lowering the tag axle, said bellows being supplied with pressure fluid via a quick-release valve and conduit branch lines which have a greater diameter than the remaining portion of the pressure fluid supply conduit means.

BRIEF DESCRIPTION OF THE DRAWING

Other objects and advantages of the invention will become more apparent from a study of the following specification when viewed in the light of the accompanying drawing, in which.

DETAILED DESCRIPTION

Figure 1:
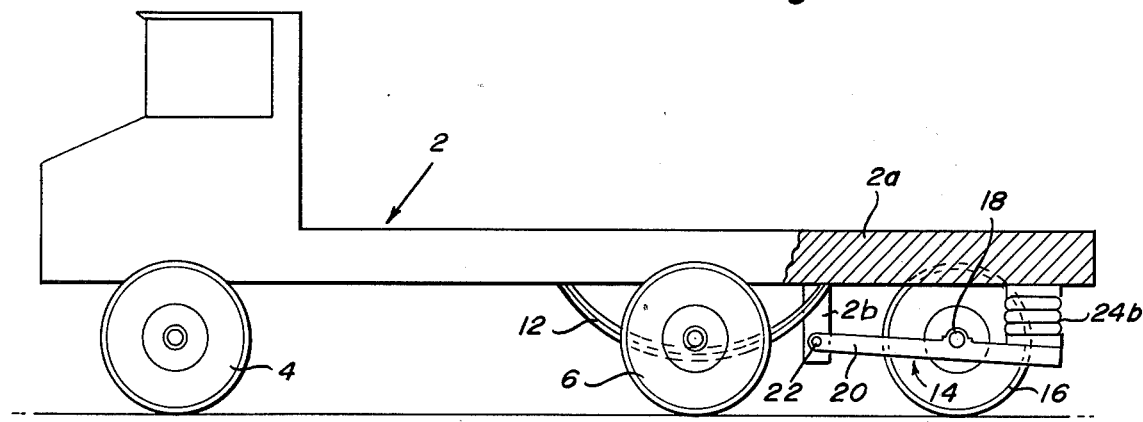
FIG. 1 illustrates diagrammatically a motor vehicle provided with tag axle means.
Figure 2:
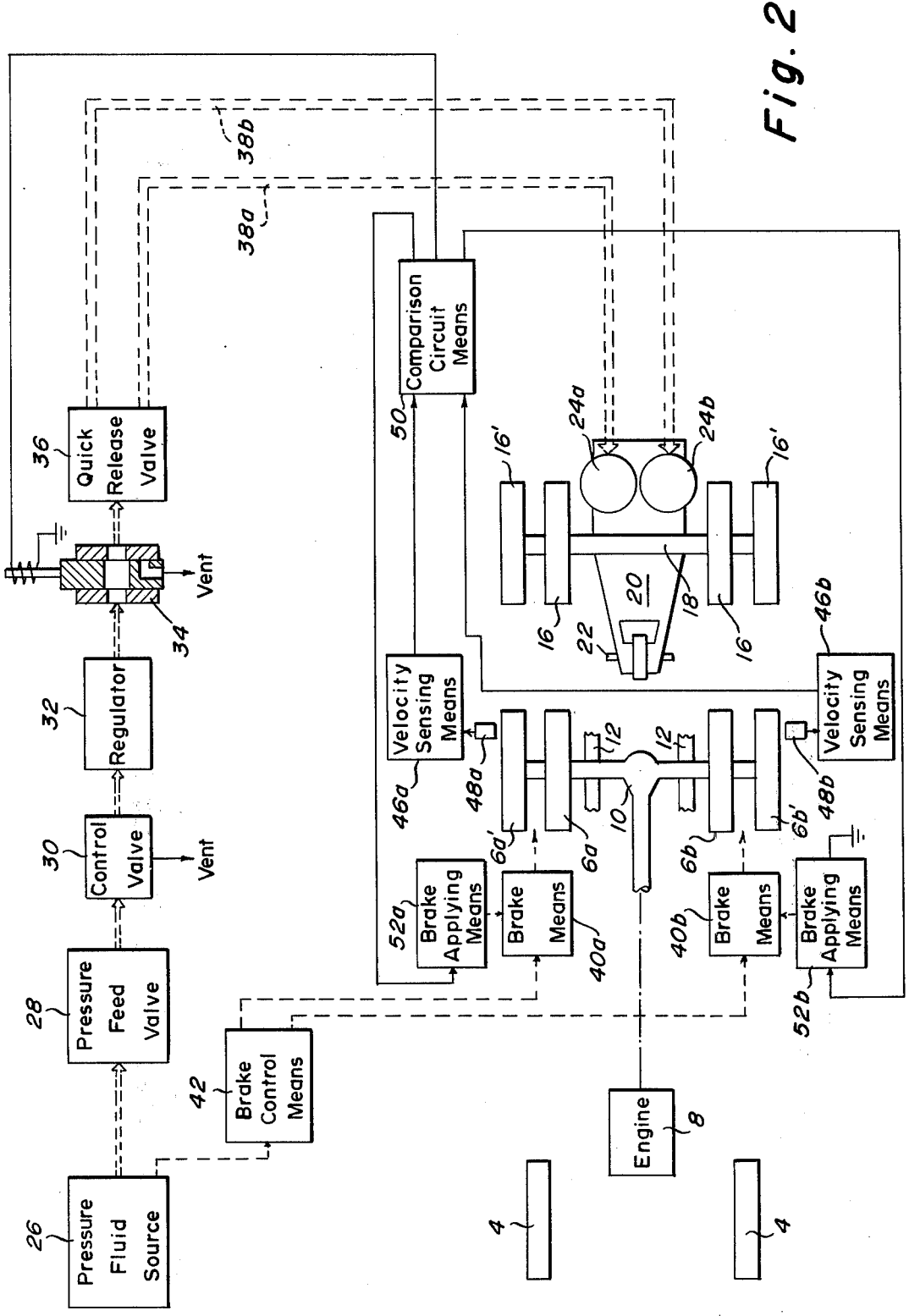
FIG. 2 is a diagrammatic illustration of the traction control system of the present invention applied to the apparatus of FIG. 1.

Referring first more particularly to FIG. 1, the motor vehicle 2 — which is a heavy duty truck or the like having a chassis frame 2a — includes a pair of front wheels 4 that are controllable to steer the motor vehicle, and a pair of rear wheels 6 that are driven by engine 8 (FIG. 2) via conventional differential means 10. The axle components associated with the driven wheels 6 are connected with the chassis frame 2a by leaf spring means 12 as is conventional in the art. The vehicle also includes tag axle means 14 including a pair of non-driven tag axle wheels 16 that are rotatably connected with the tag axle shaft 18 which is connected with the tag axle support 20 the forward end of which is pivotally connected with the chassis frame extension 2b by pivot 22. Consequently, the support 20 is vertically pivotable about the pivot axis 22 to raise or lower the non-driven tag wheels 16 and the tag axle 18 relative to the chassis frame 2a. Pressure fluid motor means in the form of a pair of bellows 24a and 24b are connected between the pivotal support 20 and the chassis from 2a for pivoting the support 20 to raise or lower the tag axle 18 and the tag axle wheels 16 relative to the chassis frame. As shown in FIG. 2, pressure fluid is normally supplied from the source 26 to the bellows elements 24a and 24b via pressure feed valve 28, control valve 30, regulator 32, two-position solenoid valve 34, quick-release valve 36, and conduit branch lines 38a and 38b, respectively. Associated with each of the driven wheels 6a and 6b are a pair of brake means 40a and 40b, respectively, that are operable by foot-operated brake control means 42 that are connected between the braking means 40a and 40b and the pressure fluid source 26.

As in the traction control system of the aforementioned Eddy application, a pair of wheel velocity sensing means 46a and 46b including conventional magnetic pickup heads 48a and 48b are associated with each of the driven wheels for generating signal voltages that are supplied to the input terminals of comparison circuit means 50. Two of the output terminals of the comparison circuit means 50 are connected with brake applying means 52a and 52b associated with the brake means 40a and 40b, respectively, and a third output terminal of the comparison circuit means is connected with the solenoid valve 34. When the solenoid valve is in the illustrated de-energized position, pressure fluid from source 26 is supplied to the bellows elements 24a and 24b via quick-release valve means 36, and when the solenoid valve 34 is in the energized condition, the pressure fluid source 26 is isolated from the bellows components 24a and 24b, and the bellows components are both vented to atmosphere via conduit lines 38a and 38b, quick-release valve 36, and the solenoid valve 34. As shown in FIG. 2, the driven wheels 6a and 6b may be provided with auxiliary coaxially arranged driven wheels 6a' and 6b', and the non-driven tag axle wheels 16 may be provided with auxiliary non-driven wheels 16'. The brake applying means 52a and 52b may be any suitable means, as, for example, the spring-brake applying means applying means illustrated in the aforementioned Eddy application.

Figure 3:
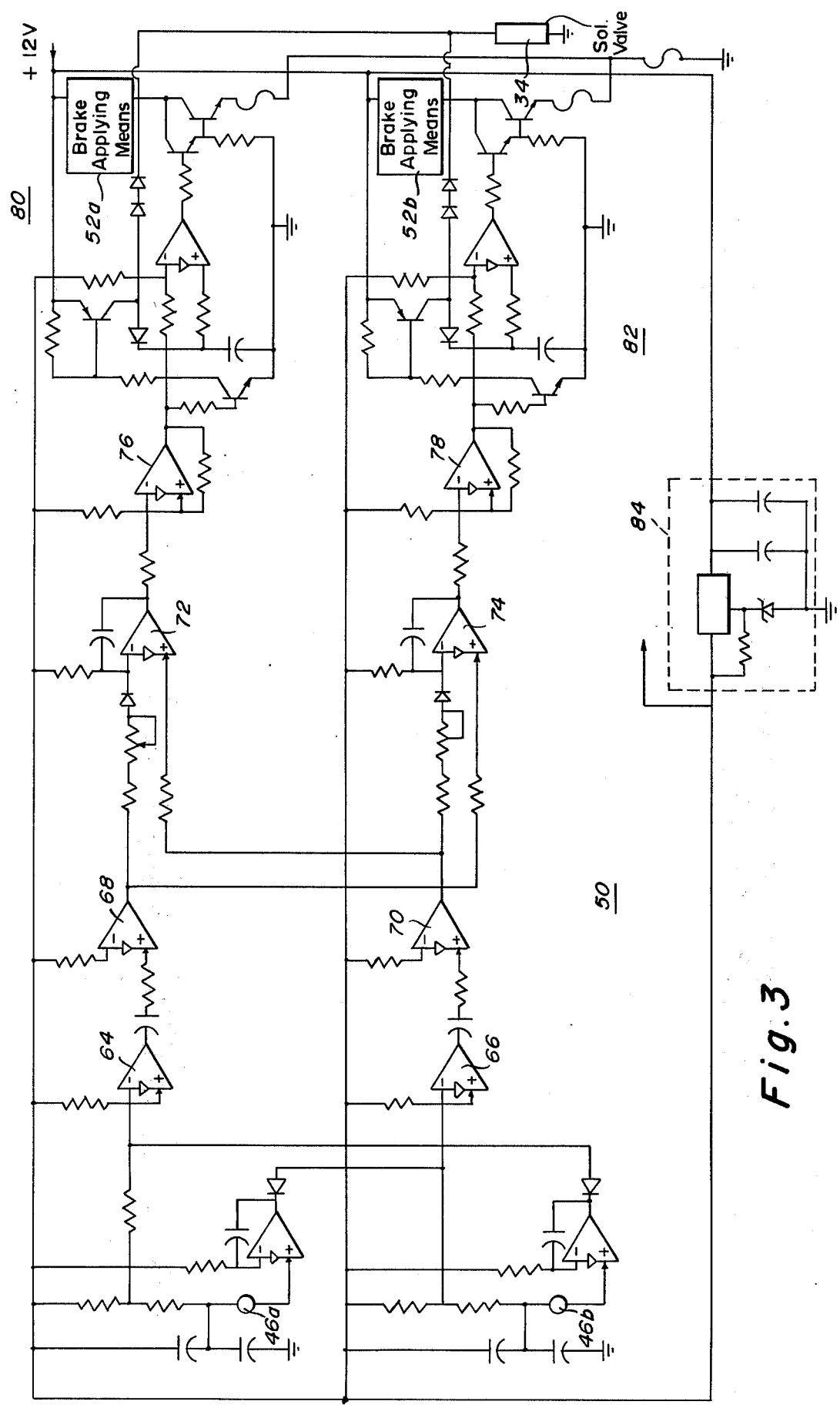
FIG. 3 is a schematic diagram of the comparison circuit means of FIG. 2.

Referring now more particularly to FIG. 3, the signal voltages from the velocity sensing means 48a and 48b are in the form of sine wave signal voltages that are supplied to the inputs of squarer amplifiers 64 and 66 which convert the sine waves to square waves. The signal voltages then pass through pulse shaping amplifiers 68 and 70 that produce pulses of equal width, the number of the pulses corresponding with the rotational velocities of the respective driven wheels. The output terminal of each pulse shaping amplifier is connected with the input terminals of a pair of integrating amplifiers 72 and 74 that are part of a differential circuit which sets the wheel speed differential. The rising direct-current signals from the integrating amplifiers are fed to the input terminals of a pair of comparators 76 and 78, respectively. Each of the comparators serves as a voltage level sensing means for actuating the associated output stage 80 and 82 when the predetermined differential value is exceeded, thereby to actuate the corresponding brake-applying means 52a and 52b, respectively. The regulated voltage power supply 84 supplies power to the comparison circuit 50. In accordance with the present invention, the solenoid valve 34 is energized simultaneously with the operation of either of the brake applying means 52a and 52b. Therefore, when either of the brake applying means 52a and 52b is actuated to effect braking of the faster of the driven wheels upon an overrunning condition, the solenoid valve 34 is simultaneously energized to vent the bellows elements 24a and 24b to transfer the vehicle load to the driven wheels 6.

In accordance with an important feature of the invention, the bellows elements are caused to have a quick dump-slow fill characteristic. More particularly, the diameters of the conduit branch lines 38a and 38b are greater than the diameter of the remaining portion of the conduit means that connect the pressure fluid source with the bellows elements. For example, the branch conduit lines 38a and 38b may be formed of ⅜-inch tubing, and the remaining portion of the fluid pressure conduit means consists of ¼-inch tubing.

OPERATION

Assume first that the vehicle is travelling in a straight line. In this case, the solenoid valve 34 is de-energized, and pressure fluid is supplied from source 26 to the bellows elements 24a and 24b via pressure feed valve 28, control valve 30, regulator 32, solenoid valve 34, quick-release valve 36 and branch conduit lines 38a and 38b. The vehicle may be braked by operation of the brake control means 42 which simultaneously operates the brake means 40a and 40b to simultaneously brake both sets of driven wheels 6. Owing to the supply of pressure fluid to the bellows elements 24a and 24b, support member is pivoted downwardly to lower the tag axle 18 and tag axle wheels 16 relative to the chassis frame 2a, whereupon a certain portion of the load on the driven wheels 6 is transferred to the tag axle wheels 16. In the event that the vehicle were to make a conventional turn, owing to the differential mechanism 10 one set of driven wheels would slightly overrun the other set of driven wheels, but since this overrunning of one set of driven wheels does not exceed the predetermined value, the comparison circuit means is not activated, and consequently the solenoid valve 34 remains de-energized, and the brake applying means 52a and 52b remain deactivated.

Assume now that one set of driven wheels 6a and 6a' overruns the other set of driven wheels 6b and 6b' (as might occur, for example, when the wheels 6a and 6a' are on an icy surface affording little traction). In this case, the signal voltage supplied by velocity sensing means 46a is greater by a predetermined value than the signal voltage supplied by velocity sensing means 46b. The output stage 80 of the comparison circuit means 50 becomes conductive, thereby simultaneously operating brake applying means 52a to brake the faster set of driven wheels 6a and 6a', and to energize solenoid valve 34, whereupon the bellows elements 24a and 24b are vented to atmosphere. Tag axle support 20 is then permitted to pivot upwardly (i.e., in the counterclockwise direction in FIG. 1) to transfer the vehicle load to the driven wheels 6. Owing to the increased load on the driven wheels 6, together with the braking of the faster set of driven wheels 6a and 6a', sufficient traction is imparted to the driven wheels 6b and 6b' to propel the vehicle off of the icy condition. When the differential rotational velocities between the two sets of driven wheels no longer exceeds the predetermined value, comparison circuit means is deactivated, brake applying means 52a is also deactivated, and the solenoid valve 34 is de-energized, whereupon pressure fluid is again supplied to the bellows elements 24a and 24b to effect transfer of a portion of the vehicle load from the driven wheels 6 to the tag axle wheels 16. Since the branch conduit lines 38a and 38b have a smaller diameter than the remaining portion of the pressure fluid supply conduit means, the refilling of the bellows will occur at a slower rate than the dumping of fluid from the bellows to atmosphere when solenoid valve 34 is energized.

Figure 4:
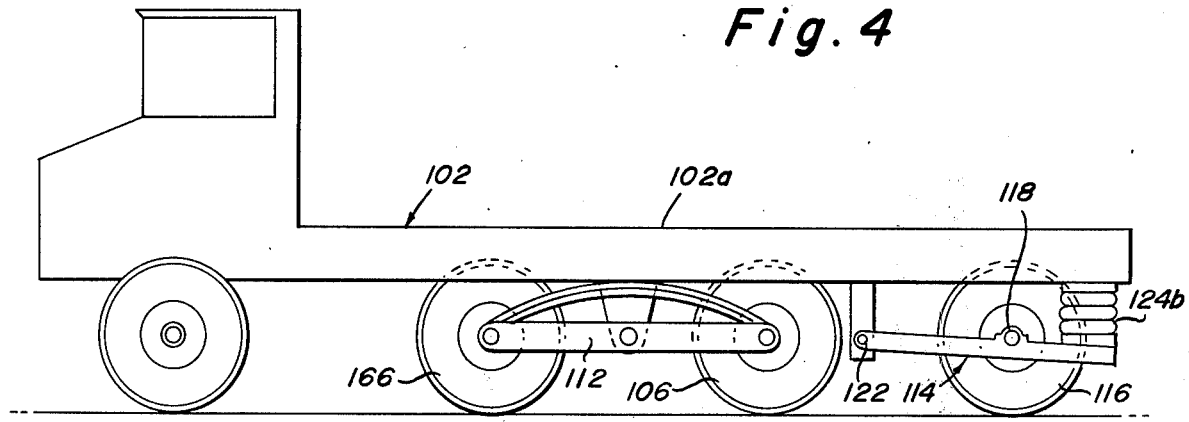
FIG. 4 is a diagrammatic illustration of a modification including tandem axle driven wheels and non-driven tag axle wheel means for transferring weight to and from the driven wheels in accordance with the present invention.

Referring now to FIG. 4, the invention of FIGS. 1-3 is also applicable to a motor vehicle 102 including tandem axle driven wheels 106 and 166 that are simultaneously driven by conventional tandem axle differential means (not shown). In this case, the tag axle means 114 are automatically operable to transfer the vehicle load to the driven wheels 106 and 166 in the event that either one set of wheels 106 and 166 overruns the other, or the wheels of either set on opposite sides of the vehicle overrun each other, thereby to actuate the comparison circuit means to effect braking of the overrunning wheels and simultaneous venting of the tag axle bellows means 124a and 124b.

Although the invention has been illustrated in connection with a motor vehicle having a pneumatic braking system, the invention is, of course, also applicable to vehicles including hydraulic, electromechanical or other type of braking system. Furthermore, while the invention has been described in connection with a motor vehicle having tag axle means (i.e., non-driven liftable wheels), the invention is equally applicable to vehicles including "pusher" or front mounted tag means (as disclosed, for example, in the Granning Suspensions, Inc. Bulletin 500 AP-571).

Figure 5:
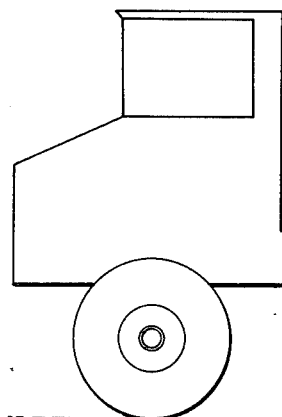
FIG. 5 is a diagrammatic illustration of a second embodiment of the invention where the pressure motor means is connected between the pair of driven wheels and the chassis frame, the pairs of driven and non-driven wheels being connected with the chassis frame by equilizer bar means.
Figure 5:
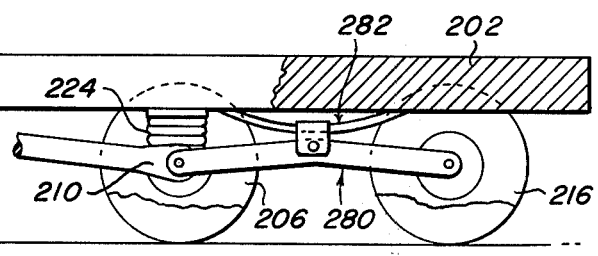
Figure 6:
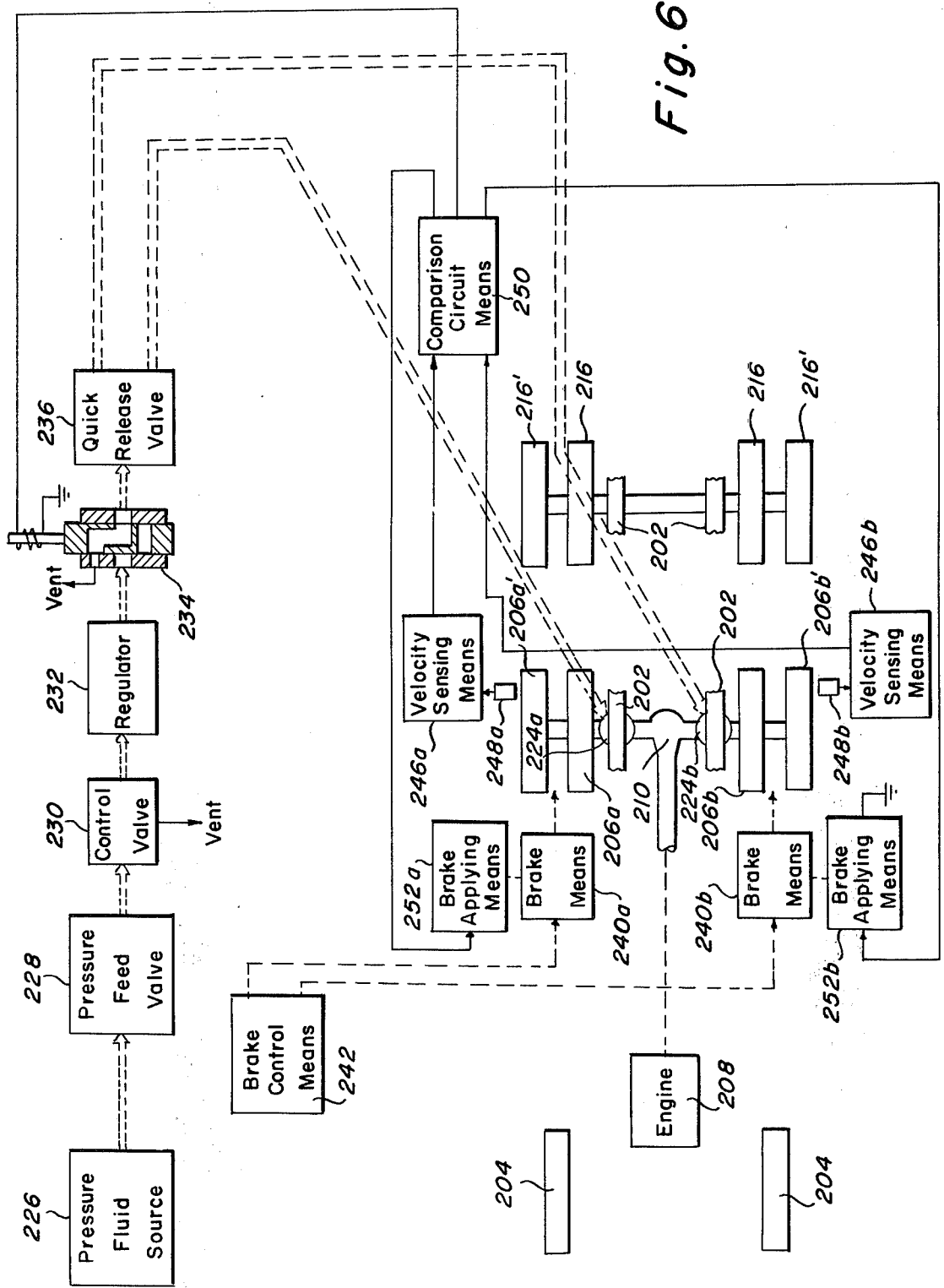
FIG. 6 is a diagrammatic illustration of the traction control system of the present invention applied to the apparatus of FIG. 5.

Referring now to the embodiment of FIGS. 5 and 6, the axle of the driven wheels 206 is connected with that of the non-driven wheels by equalizer bar means 280 an intermediate portion of which is connected with the chassis frame 202 by suspension spring means 282. In this embodiment the bellows means 224 is connected between the axle shafts of the driven wheels 206 and the chassis frame. As shown in FIG. 6, the bellows 224a and 224b are normally vented to atmosphere via the solenoid valve 234. When one of the driven wheels overruns the other by a predetermined amount, the comparison circuit means 250 simultaneously operates the brake means associated with the driven wheel having the faster rotational velocity, and operates the solenoid valve 234 to its pressurizing condition, whereupon pressure fluid from source 226 is supplied to the bellows components 224a and 224b to effect transfer of load from the non-driven wheels to the driven wheels. When the overrunning condition of the faster driven wheel is alleviated, the comparison circuit means causes the brake means to be deactivated and the solenoid valve 234 to be de-energized, whereupon the bellows components are vented to atmosphere and vehicle load is again shared by the non-driven wheels.

Figure 7:
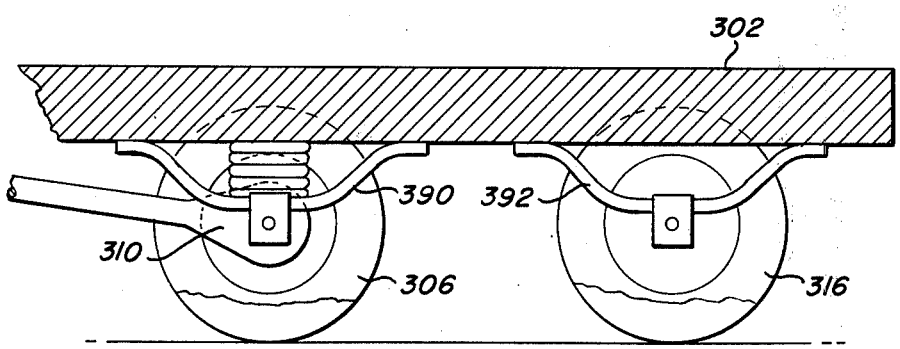
FIG. 7 is a modification of the second embodiment wherein the axles of the driven and non-driven pairs of wheels are connected with the chassis frame by separate spring pairs.

In the modification of FIG. 7, the axles of the driven and non-driven wheels 306 and 316 are independently connected with the chassis frame by separate pairs of springs 390 and 392, respectively. In this modification, when one driven wheel has a rotational velocity that exceeds that of the other driven wheel by a predetermined value, the comparison circuit means energizes the solenoid valve means to brake the faster driven wheen and to cause pressure fluid to be supplied to the pair of bellows elements 324, whereupon load is transferred from the non-driven wheels 316 to the driven wheels 306. When the overrunning condition is terminated, the brake means is de-activated and the solenoid valve is returned to its normal venting condition, whereupon vehicle load is again shared by the driven and non-driven wheels.

While in accordance with the provisions of the Patent Statutes, the preferred form and embodiments of the invention have been illustrated and described, it will be apparent to those skilled in the art that other changes and modifications may be made without deviating from the inventive concepts set forth above.

What is claimed is:

1. A traction control system for a motor vehicle including a chassis frame, comprising
    (a) a pair of driven wheels connected by a differential mechanism, said driven wheels being arranged on opposite sides of the chassis frame;
    (b) first means connecting said pair of driven wheels with said chassis frame to normally support a given portion of said frame relative to a fixed surface;
    (c) a pair of non-driven wheels connected by an axle, said non-driven wheels being arranged on opposite sides of the chassis frame;
    (d) second means connecting said pair of non-driven wheels with said chassis frame adjacent said pair of driven wheels;
    (e) load transfer means connected with said chassis frame for transferring the vehicle load to and from said pair of driven wheels, respectively, said load transfer means including
(1) pressure fluid motor means connected between one of said pairs of wheels and said chassis frame;
(2) a source of fluid pressure; and
(3) fluid pressure control means controlling the supply of pressure fluid to and from said motor means;
(f) first and second brake means associated with said driven wheels, respectively;
(g) at least two velocity sensing means for generating velocity signal voltages that are a function of the instantaneous rotational velocities of said driven wheels, respectively; and
(h) comparison circuit means operable when one velocity signal voltage exceeds the other by a predetermined amount upon the overrunning of one driven wheel relative to the other for simultaneously;
(1) actuating the brake means associated with the faster driven wheel, and
(2) operating said fluid pressure control means to cause said load transfer means to transfer vehicle load to said driven wheels.

2. Apparatus as defined in claim 1, wherein said pressure fluid control means includes
(a) conduit means connecting said pressure fluid source with said pressure fluid motor means; and
(b) solenoid valve means connected in series in said conduit means, said solenoid valve means being operable by said comparison circuit means between venting and pressurizing conditions for venting and for pressurizing said fluid pressure motor means, respectively.

3. Apparatus as defined in claim 2, wherein said pressure motor means comprises bellows means.

4. Apparatus as defined in claim 3, wherein said pressure fluid source comprises a supply of gaseous fluid under pressure, said solenoid valve means being operable to vent said bellows means to atmosphere.

5. Apparatus as defined in claim 4, wherein the portion of said conduit means adjacent said bellows means has a greater diameter than the portion of said conduit means adjacent said source, thereby to afford a slow-fill fast-release characteristic for the fluid supplied to and removed from said bellows means, respectively.

6. Apparatus as defined in claim 5, wherein said bellows means comprises a pair of bellows components arranged in longitudinally spaced relation relative to the axle of the said one pair of wheels; and further wherein said conduit means contains a quick-release valve having an input opening connected with one output of said solenoid valve means, and a pair of outlet openings connected by branch conduit lines with the said bellows components, respectively, the diameter of the branch conduit lines being greater than the diameter of the remainder of said conduit means.

7. Apparatus as defined in claim 1, and further including auxiliary driven wheels mounted coaxially with said pair of driven wheels for simultaneous driving therewith.

8. Apparatus as defined in claim 3, wherein said second means connecting said non-driven wheels with said frame comprises tag axle pivot arm means connecting the axle of said non-driven wheels with said frame for pivotal parallel displacement about a horizontal pivot axis.

9. Apparatus as defined in claim 8, wherein said bellows means is connected between said tag axle pivot arm means and said chassis frame, said solenoid valve means normally being in the pressurizing condition, whereby when the rotational velocity of one driven wheel exceeds that of the other driven wheel by a predetermined value, the solenoid valve means is operated to the venting condition, thereby to vent said bellows means to transfer load to said pair of driven wheels.

10. Apparatus as defined in claim 9, and further including an additional pair of driven wheels connected in tandem relation with said one pair of driven wheels.

11. Apparatus as defined in claim 3, wherein said bellows means is connected between said pair of driven wheels and said chassis frame.

12. Apparatus as defined in claim 11, wherein said first and second connecting means for connecting said pairs of driven and non-driven wheels with said chaissis frame comprises
(1) equalizer bar means connected between the axles of said driven and non-driven pairs of wheels; and
(2) means connecting an intermediate portion of said equilizer bar means with said chassis frame.

13. Apparatus as defined in claim 12, wherein said pair of driven wheels is arranged forwardly of said pair of non-driven wheels, and further wherein said means connecting said intermediate portion of said equalizer bar means with said frame comprises spring means.

14. Apparatus as defined in claim 11, wherein each of said first and second connecting means for connecting said pairs of driven and non-driven wheels with said frame comprises separate spring means.

15. Apparatus as defined in claim 14, wherein each of said spring means comprises a pair of springs arranged in longitudinally spaced relation relative to the associated axle adjacent opposite sides of the vehicle chassis, said pair of driven wheels being arranged forwardly of said pair of non-driven wheels.

* * * * *